I. L. JONES.
COMBINED MASK AND LIGHT CONCENTRATOR FOR AUTOMOBILE HEADLIGHTS.
APPLICATION FILED SEPT. 25, 1915.
1,167,078.
Patented Jan. 4, 1916.
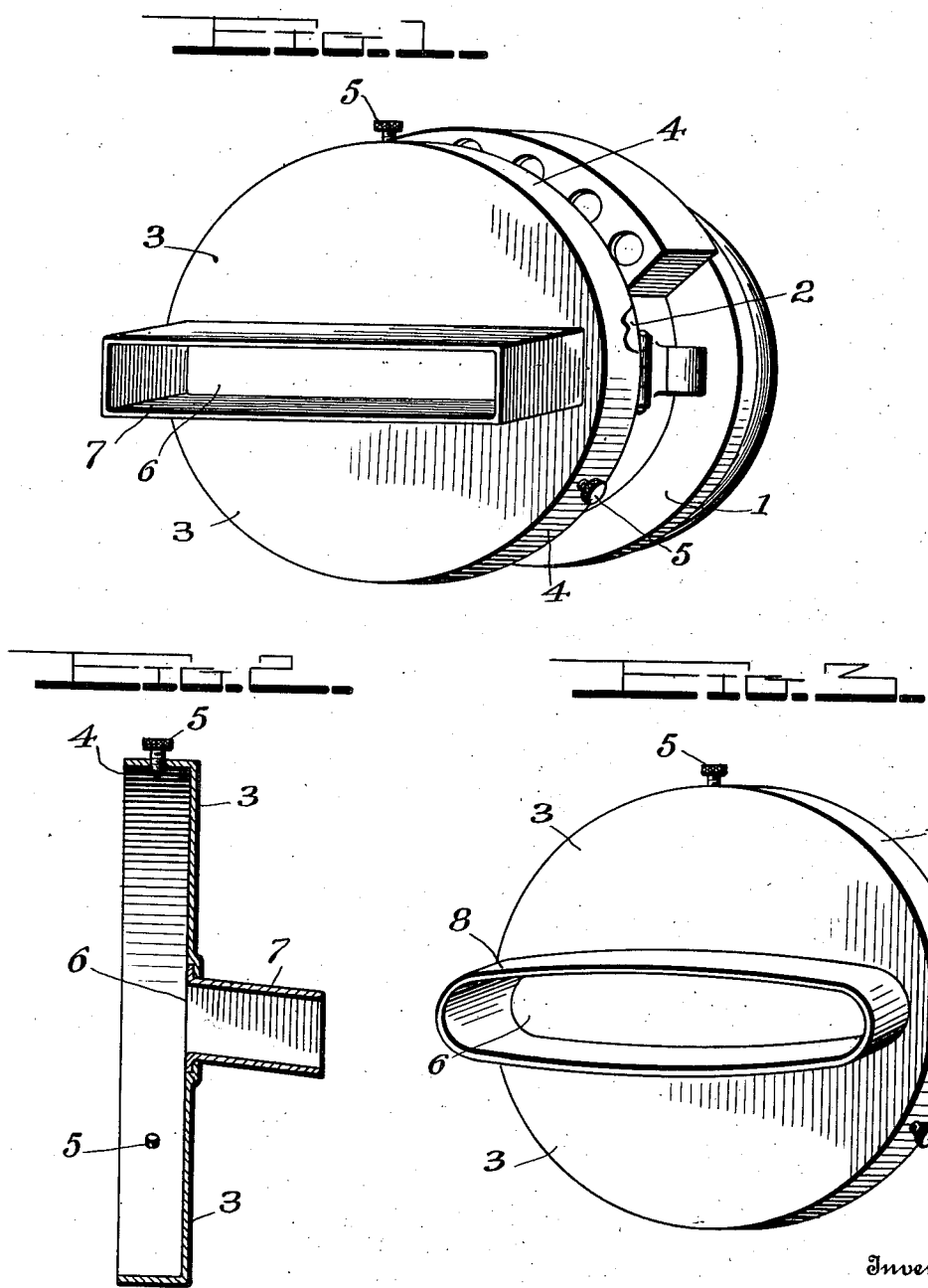
Inventor
Isaac L. Jones.

UNITED STATES PATENT OFFICE.

ISAAC L. JONES, OF BRIDGEPORT, CONNECTICUT.

COMBINED MASK AND LIGHT-CONCENTRATOR FOR AUTOMOBILE-HEADLIGHTS.

1,167,078.   Specification of Letters Patent.   Patented Jan. 4, 1916.

Application filed September 25, 1915.   Serial No. 52,611.

*To all whom it may concern:*

Be it known that I, ISAAC L. JONES, a citizen of the United States, residing at the city of Bridgeport, county of Fairfield, State of Connecticut, have invented certain new and useful Improvements in Combined Masks and Light-Concentrators for Automobile-Headlights; and I do declare the following to be a full, clear, and exact description of the invention, such as will enable others skilled in the art to which it appertains to make and use the same.

My invention has reference to certain improvements in and relating to a combined mask and light concentrator for automobile headlights, and has for its objects to prevent the flashing of the lights in the eyes of pedestrians or the occupants of approaching automobiles; to intensify the light and to concentrate the rays upon the roadway; to obtain a better focus of the light so that the latter will be directed in a lower plane and will not diffuse upwardly or laterally to any marked degree, thereby greatly aiding the driver of a machine, and preventing the fouling of the glass of the lamp proper.

I am aware that attempts to attain these objects have heretofore been made, but in prior structures no attention appears to have been paid to the concentrating of the light rays so as to prevent downward or lateral diffusion thereof in the immediate vicinity of the lamp itself. Furthermore, shed or dome-like structures have been provided which project forwardly from the face of the light so as to prevent the glare thereof in the faces of pedestrians or the occupants of approaching machines, but these structures made no provision for concentrating the light rays so that they can be directed upon the roadway considerably in advance of the lamp itself without the diffusing of these rays laterally and downwardly in the vicinity of the light.

My invention has for its main aim to confine and concentrate the light rays as against downward or lateral diffusion in the immediate vicinity of the light itself, in order that they will be naturally intensified and will be directed toward the roadway so as to initially strike the latter at a distance considerably in advance of an automobile carrying the lights, such distance being, of course, predetermined by the angle at which these rays are deflected by my improvement.

My invention also resides in the salient features of construction, arrangement and combination of parts hereinafter described and claimed, and illustrated in one of its preferred embodiments in the accompanying drawings wherein—

Figure 1 is a perspective view showing a lamp with my improvement applied thereto. Fig. 2 a detail sectional elevation of my device, and Fig. 3 is a view similar to Fig. 1 but showing a slight modification of my improvement.

Similar numerals of reference denote like parts in the several figures of the drawing.

1 represents any suitable lamp body and 2 the usual door thereof that is hinged to said body and which carries the glass element through which the rays of light pass.

My improvement contemplates a front plate or body 3 made of any suitable opaque material, preferably brass or any other material capable of being provided with a highly polished surface, this front plate or body having an area co-extensive with that of the front of the lamp and having its perimeter provided with an inwardly extending flange 4 which latter snugly fits over and around the circumference of the door 2 and is secured thereto in any suitable manner, preferably by means of set screws 5. This front plate or body 3 has an opening 6 which is elongated horizontally and extends throughout substantially the entire width of said plate or body so that the length of this opening is practically equal to the face width of the door 2. The width proper of this opening, or, in other words, the distance between the upper and lower walls thereof, is comparatively narrow, being about two and one-half inches more or less, the medial line between said walls being substantially in the same horizontal plane with the source of light. Secured to this plate or body 3 is a box-like structure 7 which is open at the ends but entirely closed on all sides. This box-like structure 7 extends forwardly from the body 3 a suitable distance, about three inches more or less, and is declined from said body at any suitable and predetermined angle, so as to initially cause the rays of light to strike the roadway at a point nearer to or farther away from an automobile as may be desired.

The rear face of the body 3 and the inner surfaces of the box-like structure 7 are preferably highly polished so as to aid in the reflection of the light rays, which latter are concentrated and projected through the structure 7 onto the roadway.

There can be no diffusion of the light rays in any direction except at a considerable distance in advance of the automobile, so that the driver thereof will have the advantage of darkness in the immediate vicinity of his machine, while the roadway will be brilliantly lighted by the concentrated rays at a distance sufficiently near the automobile to enable the driver to direct his car most advantageously. These concentrated light rays will be projected in front of the car so that the rays will not diffuse to any marked extent, either downwardly or laterally, until just about the time when they strike the roadway and thereafter the latter at the sides will be amply lighted, while straightaway the roadway will be illumined for a distance fully as great as in the instance of the headlights in common use.

The body portion 3 immediately above and below the box-like structure 7 completely masks the light, and, since the structure 7 is deflected, as hereinbefore set forth, the rays of light cannot possibly strike the faces of approaching automobilists or pedestrians, and this is true even when an automobile, equipped with my improvement, is turning a corner. Furthermore, it will be clear that the complete closing of this structure 7 except at the ends will result in the protection of the glass, which houses the source of light, against fouling. It will, of course, be obvious that this box-like structure 7 may be so fixed to the body portion 3 as to be adjustable, so that the angle of deflection, which might possibly change according to the height of the lamps above the ground, may be regulated, but I prefer to secure this structure 7 in fixed relation to the body 3, the angle of deflection being predetermined by the fact that automobile headlights are generally located at substantially the same distance above the ground. At Fig. 1 I have illustrated this box-like structure 7 as rectangular in shape, but it will, of course, be obvious that my improvement is not limited to any particular shape of this structure in cross section, and accordingly, at Fig. 3, I have illustrated a slight modification in which I have provided a box-like structure 8 that resembles in cross section a flat oval, that is to say, the lateral boundaries instead of being straight are curved, and I therefore do not wish to be limited in this respect.

While I have shown and described the body portion 3 as provided with an inwardly extended flange for the purposes of securing my improvement to the door of an automobile headlight, it will, of course, be clear that this is only one way in which my improvement can be secured in position when the latter is furnished as an attachment to an automobile headlight, since it will, of course, be obvious that a headlight might be constructed embodying my improvement, in which the main body portion could be affixed to the door or perhaps integral therewith, in which instance it would be only necessary to provide the glass element so that it would merely cover and inclose the rear opening of the structure 7, and I therefore do not wish to be limited to any particular manner of affixing my improvement to the lamp itself.

What I claim as new and desire to secure by Letters Patent is:—

1. In an automobile head lamp, an opaque mask having a highly polished rear face and provided with a central, elongated and horizontally disposed light-emitting opening, and a forwardly and downwardly inclined box-like structure closed completely at its sides, top and bottom, said structure having its interior highly polished.

2. In an automobile head lamp, a mask comprising a flat disk-shaped plate having a diametrical elongated opening and a rearwardly extending peripheral flange adapted to receive the forward part of the lamp, radially disposed series of set screws carried by the flange for securing the mask to the lamp, and a forwardly and downwardly inclined box-like structure open at each end and having its sides, top and bottom completely closed, said structure being secured to the mask in coincidence with the opening thereof and having its sides parallel and the top parallel with the bottom.

3. An automobile head lamp whose front face portion is masked throughout its entire horizontal width above and below a light emitting opening which extends horizontally throughout substantially the entire width of said face portion, and a downwardly deflected box-like structure completely closed except at the ends and projecting from said opening for concentrating and directing the light from the latter.

4. In an automobile head lamp, a mask applied to the front face portion of said lamp and having a horizontally disposed light emitting opening whose medial horizontal line substantially coincides with the diameter of said face portion, and a downwardly inclined box-like structure closed at the sides and open at the ends and coincidently projecting from said opening.

5. In an automobile head lamp, a mask applied to the front face portion of said lamp, a light emitting opening extending throughout the horizontal medial portion of said mask which latter covers the entire area of said front face except that part which coincides with said opening, and a light concentrator and director comprising a deflected box-like structure completely closed at the sides, top and bottom and open at the ends and projecting from said mask in coincidence with said opening.

In testimony whereof I affix my signature in presence of two witnesses.

ISAAC L. JONES.

Witnesses:
F. W. SMITH, Jr.,
M. T. LONGDEN.